United States Patent [19]

Jones et al.

[11] Patent Number: 5,033,076
[45] Date of Patent: Jul. 16, 1991

[54] ENHANCED PRIVACY FEATURE FOR TELEPHONE SYSTEMS

[75] Inventors: William C. Jones, Wheaton; Wayne R. Kalbow, Glen Ellyn; Eric T. Larsen, Glen Ellyn; Elizabeth M. Mazur, Oswego, all of Ill.

[73] Assignee: AT&T Bell Laboratories, Murray Hill, N.J.

[21] Appl. No.: 473,003

[22] Filed: Jan. 31, 1990

[51] Int. Cl.$^5$ .................. H04M 1/57; H04M 1/66; H04M 3/38; H04M 3/50
[52] U.S. Cl. ................................ 379/67; 379/45; 379/88; 379/142; 379/197; 379/199; 379/244
[58] Field of Search ................ 379/45, 67, 88, 142, 379/196, 197, 199, 201, 211, 212, 213, 246, 247, 249, 244

[56] References Cited

U.S. PATENT DOCUMENTS

| | | | |
|---|---|---|---|
| 4,277,649 | 7/1981 | Sheinbein | 379/201 |
| 4,320,258 | 3/1982 | McDonald | 379/201 |
| 4,551,581 | 11/1985 | Doughty | 379/94 |
| 4,591,665 | 5/1986 | Foster et al. | 379/142 |
| 4,922,490 | 5/1990 | Blakley | 370/110.1 |

OTHER PUBLICATIONS

"ANI is the Key to Unlock Advanced Network Services", K. G. Hegebarth, *Telephony*, Nov. 14, 1988, pp. 64, 66, 68 [379/45].
Bellcore Technical Reference TR-TSY-000030, Issue 1, Nov. 1988, "SPCS Customer Premises Equipment Data Interface".
Bellcore Technical Reference TR-TSY-000031, Issue 2, Jun. 1988, "Class SM Feature: Calling Number Delivery".
Bellcore Technical Reference TR-TSY-000215, Issue 1, Sept. 1988, "Class SM Feature: Automatic Callback".
Bellcore Technical Reference TR-TSY-000216, Issue 2, Jun. 1988, "Class SM Feature: Customer Originated Trace".
Bellcore Technical Reference TR-TSY-000217, Issue 2, Nov. 1988, "Class SM Feature: Selective Call Forwarding".
Bellcore Technical Reference TR-TSY-000218, Issue 2, Nov. 1988, "Class SM Feature: Selective Call Rejection".
Bellcore Technical Reference TR-TSY-000219, Issue 2, Nov. 1988, "Class SM Feature: Distinctive Ringing-/Call Waiting".
Bellcore Technical Reference TR-TSY-000227, Issue 1, Sept. 1988, "Class SM Feature: Automatic Recall".
Bellcore Technical Reference TR-TSY-000391, Issue 2, Jun. 1988, "Class SM Feature: Calling Number Delivery Blocking".

*Primary Examiner*—Thomas W. Brown
*Attorney, Agent, or Firm*—W. Ulrich

[57] ABSTRACT

This invention relates to apparatus and a method for use in conjunction with a service wherein a called telephone customer receives a display of the number of a calling telephone customer. In conjunction with this service, customers are offered a class of service and/or an option to dial a privacy request wherein their telephone number will not be displayed to the called telephone customer. In accordance with this invention, the customers are offered a class of service wherein they will receive calls only from telephone customers willing to have their telephone number displayed. If a call is made from a caller who does not wish to have his number displayed to a called customer who will not accept calls from customers unwilling to identify themselves, the caller is given a special announcement; in response to this announcement if the caller keys a special privacy override code then the call is completed with the caller's number displayed. Law enforcement agencies may be provided with a class of service which allows them to obtain a caller's number even when the caller has invoked privacy. Advantageously, such an arrangement protects telephone customers from receiving harassing calls, protects the privacy of those customers who normally do not wish to have their telephone number identified to the called customer, and permits calls to be completed between such customers.

16 Claims, 2 Drawing Sheets

ENHANCED PRIVACY FEATURE FOR TELEPHONE SYSTEMS

TECHNICAL FIELD

This invention relates to a method and apparatus for selectively controlling the privacy of a customer's number on telephone calls.

PROBLEM

Telephone switching systems exchange information, such as the telephone number of a called customer, by signaling such information using a variety of signaling arrangements. In modern telephone systems, much of the signaling between individual telephone switching systems is now performed over common channel Signaling System 7 (SS7), a system that has been standardized by the Consultative Committee on International Telephone and Telegraph (CCITT). Among the features that are made possible through the SS7 signaling is the forwarding of a calling telephone number to the switching system that is connected to the called telephone station. By forwarding the calling customer's telephone number, it is possible to implement a number of features such as: selective call forwarding wherein calls from only a few sources are forwarded to an alternate destination (for example, a businessman going home after work might specifically forward a call from an important client); distinctive ringing for calls from certain sources to encourage people to answer calls from important customers quickly; selective call rejection to permit customers to reject calls from known harassing sources; individual calling line identification wherein a called station has a display unit for displaying the number of the calling customer; bulk calling line identification wherein a called customer may receive over a dedicated data link the identification of all customers who have called recently; auto recall for automatically completing calls to a destination that was previously called or a station that was originally busy as soon as that station becomes available; and auto callback for automatically calling back the calling customer who most recently called, with or without receiving an answer.

A problem with such systems that forward a calling customer's number is that of protecting the privacy of telephone customers who do not wish to have their telephone numbers known. These are customers who typically use unlisted telephone numbers and who may wish to be protected from receiving unwanted calls. In some present arrangements, such customers may invoke either a permanent private service or privacy on a per-call basis; the permanent privacy feature can be overridden at the caller's option for any specific call. When privacy is invoked by either of these methods, the calling number is forwarded to a terminating switching system connected to the called customer but is prevented from reaching the called customer who, in the case of a display unit, receives an indication, in this case a display of the letter P, indicating privacy instead of a telephone number. However, the forwarded telephone number can still be used for features such as selective call forwarding, distinctive ringing, selective call rejection, automatic recall and automatic callback. For the first three of these features, the called customer must already have knowledge of the private number of the calling customer or have used the calling number delivered from a previous call; and for the case of auto callback and auto recall, the calling customer who wanted privacy has already placed a call and as long as the called customer is not informed of the calling number, there should be no objection to completing that call.

While this arrangement serves to protect the calling customers, it does not protect called customers in a satisfactory manner. A problem of the prior art is that there is no convenient arrangement available today to permit called customers to accept calls only from customers who are willing to identify themselves; further, even if such an arrangement were to be made available, there would be no convenient means to permit a calling customer who has invoked permanent privacy to call a called customer who does not wish to receive calls from people unwilling to identify themselves.

SOLUTION

In accordance with the principles of this invention, called customers are provided with a new class of service for providing a call screening service whereby such called customers will receive only calls from calling customers who are willing to have their telephone number identified. Advantageously, such an arrangement protects such customers from harassment by callers unwilling to identify themselves.

In accordance with one aspect of the invention, when such a calling customer makes a call to a called customer having the new class of service, the calling customer receives an announcement indicating the privacy status of the called customer. In response to this announcement, the calling customer illustratively may effect a completion of the call in a non-privacy mode either by invoking a per-call privacy override if the calling customer is in the permanently private mode, or simply reverting to the public mode if the calling customer originally placed the call in the privacy mode. Thus, when the calling customer hears an announcement and dialing instructions, the calling customer may key a special digit, for example, the digit 1, to override the caller's privacy for this call and allow the calling number to be displayed to or be recalled by the called customer and therefore allow the call to be completed. In this way, the access to the called customer is protected since the called customer is enabled to receive calls only from callers willing to identify themselves, and the privacy of the calling customer is protected since the calling party is identified only when the calling party specifically grants permission for such identification.

Certain public service agencies such as the police, fire department, and substance or personal abuse centers may wish to have a feature whereby the privacy request of the caller is overridden. In accordance with another feature of this invention, such agencies are provided with another special class of service. For a called customer with this other special class of service, if the calling customer has placed a call with privacy, the called customer signals to have the switching system automatically override this privacy and have the calling customer number displayed or otherwise provided.

Illustratively, a call setup message is sent from an originating switching system to a terminating switching system. The call setup message includes the privacy information of the call, i.e., whether the caller number, or other caller identification such as a name, is to be provided to the called station. The privacy information is obtained from a special privacy code dialed from the caller station or from the class of service of the caller stored in the originating switching system. The called customer's class of service is consulted; if the call setup message specifies privacy and the called station has the new class of service, as recorded in the terminating switching system, then the call cannot be established unless the calling station signals to have the calling customer identification privacy instruction removed for this call. In that case, the call is completed and the calling customer identification is provided to the called customer station. In the illustrative embodiment, both switching systems are operative under the control of a stored program. If the called station has, as part of its class of service, the privacy override feature, then the call is completed without additional signals from the calling station, and the called station can request the calling identification; alternatively, the calling identification can be automatically provided to such a called station without a special request.

In accordance with another feature of the invention, a called station can request an announcement or display of a calling station identification by sending a request message to its connected switching system. This allows for deferred access and announcement access to the calling station identification.

DETAILED DESCRIPTION

Figure 1:
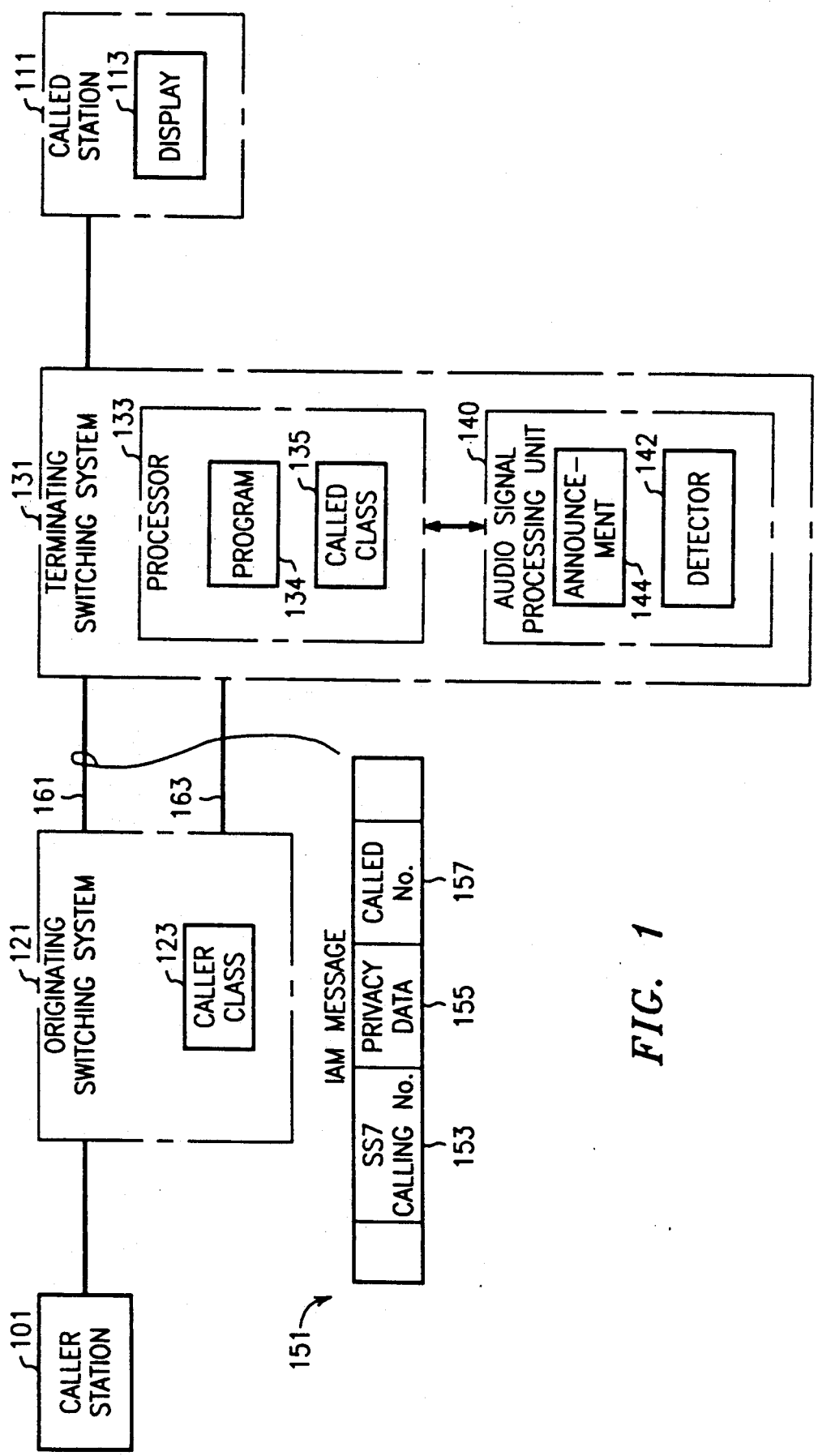
FIG. 1 is a block diagram of a communications network for implementing applicant's invention.

FIG. 1 is a block diagram illustrating the principles of this invention. A call is set up from a caller station 101 to a called station 111 over a telecommunications network that includes switching systems 121 and 131. The stations are conventional telephone subsets operating under human control or computer terminals or personal computers, operating under program as well as human control. Called station 111 is provided with a display device 113 or receives communications from the connected switch via an announcement. Caller station 101 is connected to an originating switching system 121 in which the class of service of the caller is stored (block 123). This caller class identifies whether the caller wishes to have his telephone number or other caller identification such as a name maintained private or whether he is willing to have it displayed or otherwise provided to the called customer station. If a caller name is to be provided, this is sent with the IAM message from switch 121 to switch 123. The caller class information stored in the switching system is arranged to include a class of permanent private/public and a class of optional per-call private/public. The privacy class of a call for a customer having permanent private is changed for one call by the dialing of a special privacy toggle code. The optional privacy can at the discretion of the operating telephone company, be provided to all customers or only to customers who subscribe to that service.

The originating switch 121, similar to terminating switch 131, is connected to that terminating switch by message signaling information facilities 161 and voice transmission facilities 163. In this specific embodiment, the originating switch 121 and terminating switch 131 are both stored program controlled switches, specifically, 1A ESS ™ switches, whose operation is similar to that of the 1 ESS described in *The Bell System Technical Journal*, September, 1964, adapted to use a 1A processor described in *The Bell System Technical Journal*, February, 1977. The description of the 1 ESS includes a description of translations for storing a class of service and of methods for controlling establishment of call connections. The terminating switch comprises a processor 133 which includes a program 134 for controlling the execution of a program for implementing the invention in accordance with the steps outlined in the flow diagram of FIG. 2. Processor 133 further comprises a plurality of memory blocks for storing incoming calling party directory numbers and associated privacy data and the class of service of called customer 111 information (block 135). In addition, terminating switching system 131 includes an audio signal processing unit 140 comprising a detector 142 for detecting dual tone multi-frequency (DTMF) signals keyed from customer stations and an announcement unit 144 for generating announcements.

When a caller station 101 originates a call, originating switching system 121 checks the caller class information 123 to determine whether caller station 101 desires to have its number maintained private for this call. After originating switching system 121 has received the dialed information for the call, it sends an initial address message (IAM) 151 over message link 161 to terminating switch 131. The IAM message is a standard SS7 message. Message 151 includes the calling number 153 (included whether or not the calling customer requested privacy), caller privacy data 155 which will indicate privacy if the caller has requested privacy for this call, and the called number 157. Upon receipt of IAM message 151, terminating switching system 131 checks the message 151 and checks the class of service 135 of the called number received in the IAM message. If the caller had requested privacy and the called customer has a class of service whereby it only accepts calls from customers willing to provide their identification, then the call is tentatively blocked. The caller receives a message, such as an announcement identifying the reason for the blocking of the call. For working within automatic stations such as personal computers, the message would be a data message. In response to this message, the caller can key in an override indication, in this specific embodiment, the number 1, which is detected by detector 142. If this 1 is detected, then the call is completed and the called customer is provided with the caller station telephone number. If the caller fails to provide the keyed 1, then the call attempt is disconnected. If the class of service 135 of the called customer is such that the called customer will accept calls from stations unwilling to identify themselves, then the call is completed without providing the identification of the caller to the called customer station.

Figure 2:
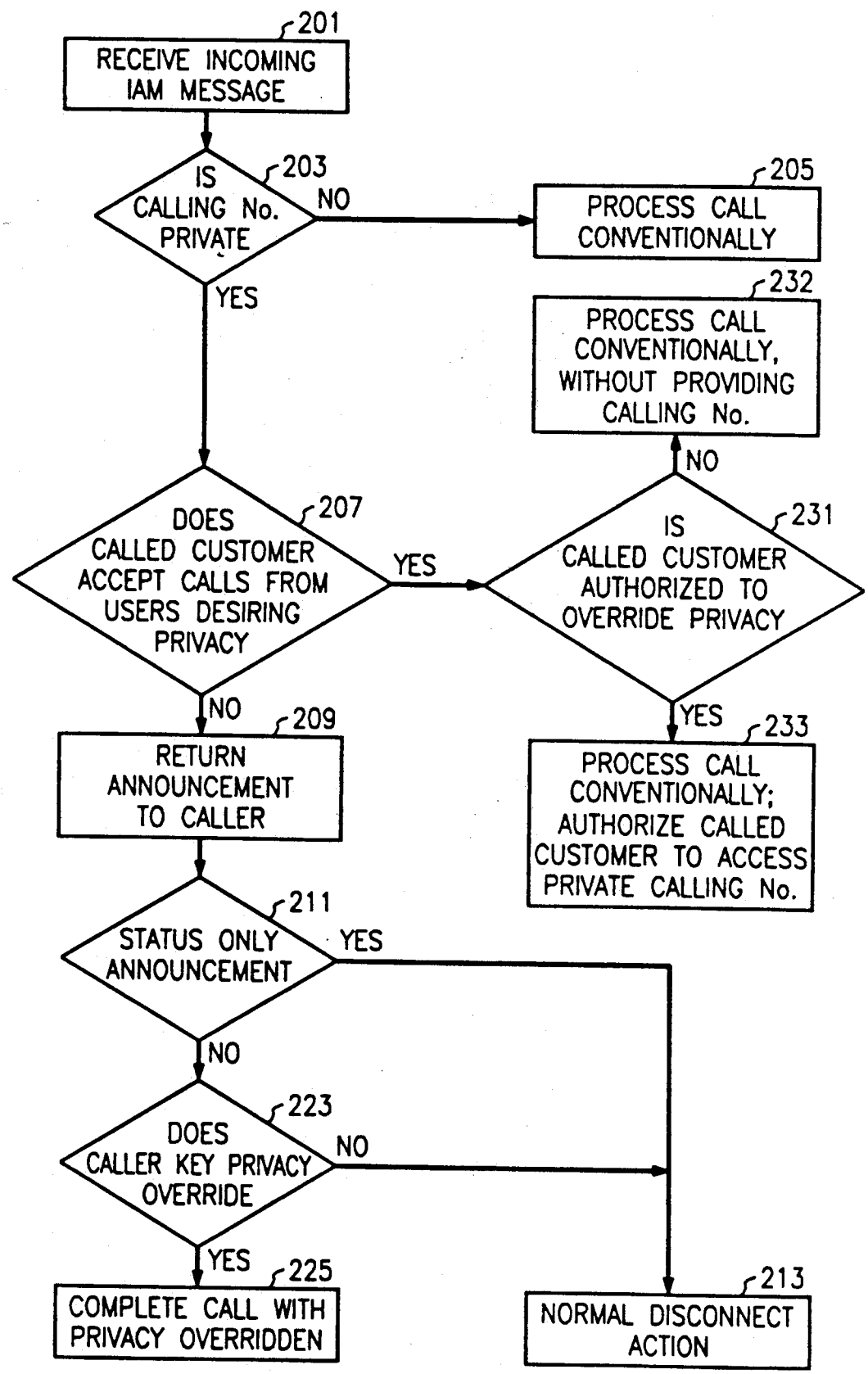
FIG. 2 is a flow chart of a program in a terminating switching system of FIG. 1 for controlling the steps of a method for implementing applicant's invention.

FIG. 2 is a flow diagram of a program implemented in the processor 133 of the terminating switching system 131. Terminating switching system 131 receives an IAM message (action block 201). It examines segment 155 of the incoming IAM message to determine whether the caller has requested that the calling number be maintained private (test 203). If not, then the call is processed conventionally as in the prior art (action block 205). If the result of test 203 is positive, then the class of service of the called customer is examined to determine whether the called customer will accept calls from users wishing to maintain their privacy (test 207).

If the result of test 207 is negative then an announcement is returned to the caller (action block 209). Two types of announcements are available for two alternative implementations of applicants' invention. Test 211 determines which implementation is being used. If the announcement is a status only announcement (positive result of test 211) then the call is abandoned after the announcement has been delivered (action block 213) using normal call abandonment procedures as in the prior art. If the announcement not only indicates the status of the call but invites the customer to override his privacy request for this call (negative result of test 211), then a detector is attached to the call (action block 221) to check whether the calling customer keys the privacy override signal. If the caller does key the privacy override signal (positive result of test 223) then the call is completed with privacy overridden (action block 225). If the caller fails to key the privacy override signal then the call is abandoned (action block 213). To handle originating customers who do not have DTMF stations, the call would be automatically completed, including the privacy override, if the originating customer fails to disconnect within a specified interval of, perhaps, 10 seconds; for this alternative sequence, the call is disconnected only in response to receipt of a disconnect signal from the caller.

In an alternative embodiment, not shown, the announcement would be provided from the originating switch 121, and would be requested by a message from terminating switch 131. If the call is then to be established, another message is sent to switch 131.

Some public service agencies such as the police department, fire department, drug abuse centers, may be granted authority to override the calling customer's request for maintaining the privacy of his number. If that service is provided in terminating switch 131, then following the detection in test 207 that the called customer accepts calls from users wishing privacy, a further test 231 is performed to check whether the called customer is authorized to automatically override the privacy request. If not, then the call is processed conventionally (action block 205). If so, then the call is completed and the called customer is authorized to access the private data for that call (action block 233). In some cases, the called customer will automatically be provided with the caller identification.

Information may be provided to the called customer in a number of ways. Switch 131 stores the caller identification during and after the call. If the called customer has a display, the information may be simply transmitted and displayed. If the called customer does not have a display and perhaps may not always want the identification of the caller, the called customer has the option of keying a calling number request to terminating switch 131. In response to this keyed request, terminating switch 131 connects announce unit 144 to the called customer and controls announce unit 144 to announce the number of the caller of the immediately preceding call or controls a display to display the number if the customer has a display. The keyed request can also be used to access caller identifications of earlier calls.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. In a telecommunications switching system, a method of screening a telecommunications call from a caller station to a called station comprising the steps of:
   responsive to receipt by said system of a call signaling message for said call, said message comprising data indicating that the caller station has requested privacy for the call, in said telecommunications switching system, automatically selectively controlling a rejection of said call if said called station does not accept calls for which the caller station has requested privacy for the call; and
   controlling a completion of said call if said called station accepts calls for which an identification of said caller is not provided.

2. The method of claim 1 wherein said data is derived from a class of service of said caller station.

3. The method of claim 1 wherein said selectively controlling a rejection and controlling a completion of said call is based on a class of service of said called station.

4. The method of claim 1 wherein said selectively controlling a rejection comprises the steps of:
   providing toward said caller station an information message inviting a response signal;
   responsive to a prespecified signal receivable from said caller station, controlling completion of said call and controlling providing of an identification of said caller to said called station; and
   in the absence of receipt of said prespecified receivable signal, controlling disconnection of said call.

5. The method of claim 1 wherein said selectively controlling a rejection comprises the steps of:
   providing toward said caller station an information message inviting a response signal;
   responsive to a prespecified signal receivable from said caller station, controlling completion of said call and controlling providing of an identification of said caller to said called station; and
   responsive to a disconnect signal receivable from said caller station, controlling disconnection of said call.

6. The method of claim 1 wherein said selectively controlling a rejection comprises the steps of:
   providing toward said caller station an information message inviting a response signal;
   responsive to a prespecified signal receivable from said caller station, controlling completion of said call and controlling providing of an identification of said caller to said called station; and
   in the absence of receipt of said prespecified signal for a predetermined period of time, controlling completion of said call and controlling providing of said identification of said caller.

7. The method of claim 1 wherein said selectively controlling a rejection comprises:
   controlling the providing to said caller station of a verbal call status announcement indicating that said called station does not accept unidentified calls.

8. The method of claim 1 further comprising controlling a completion of said call and providing the caller identification to a called station authorized to receive a caller identification even when said caller station has requested privacy for the call.

9. The method of claim 8 wherein said called station is authorized by a class of service.

10. In a switching system, a telephone privacy arrangement comprising:

means for storing a class of service indication comprising data identifying a called station of said switching system that does not accept calls from calling stations unwilling to have their caller identification provided; and processor means, operative under the control of a program, and responsive to receipt of a call signaling message for a call, said message comprising data indicating that a caller station has requested privacy for the call for controlling rejection of said call for said called station.

11. The arrangement of claim 10 further comprising:
means for providing an announcement;
wherein said processor means is further operative under the control of said program for controlling said means for providing an announcement for providing a call status announcement toward said caller station.

12. The arrangement of claim 10 further comprising:
means for providing an announcement to said caller station; and
means for detecting a signal receivable from said caller station;
wherein said processor means is further operative under the control of a program for controlling the connection of said means for providing an announcement to said caller station, said announcement indicating that said call cannot be completed unless a privacy override indication is received and connection of said means for detecting to said call and, responsive to the detection of a prespecified signal receivable from said caller station, for controlling the completion of said call and for providing said caller identification to said called station.

13. A method of controlling establishment of a call from a caller station, comprising:
originating a call over a telecommunications network for which a caller station has requested privacy for said call; and
responsive to receipt of a message from said network, said message received after a completion of dialing of said call and said message indicating that said call cannot be completed unless said caller station provides a privacy override indication, sending a privacy override indication to said network for requesting completion of said call and provision of a caller identification to said called station.

14. The method of claim 13 wherein said originating comprises originating a call from said caller station, wherein said caller station has a class of service indicating a caller station request that said caller identification should not be provided to called stations.

15. A method of controlling provision of a caller identification of a caller station to a called station for a telecommunications call comprising the steps of:
storing a caller privacy class of service for said caller station in a first switching system, said caller class of service indicating that said caller identification should not normally be provided on calls originated by said caller station;
storing a called privacy class of service for said called station in a second switching system, said called privacy class of service indicating that said called station does not accept calls for which a caller identification is not provided;
requesting in said first switching system a call connection from said caller station toward said called station;
responsive to said requesting and to said caller privacy class of service of said caller station, transmitting a call setup message from said first switching system to said second switching system comprising said caller identification, a request to establish a connection to said called station and an indication that said caller station has requested privacy for the call;
responsive to receipt of said call setup message, and to said stored called privacy class of service of said called station, returning an announcement to said calling station, requesting a privacy override request signal from said caller station for allowing completion of said call; and
responsive to receipt of said override request signal from said caller station, completing said call and providing said caller identification to said called station.

16. The method of claim 15 wherein said transmitting comprises:
transmitting one of a set of standard SS7 messages.

* * * * *